United States Patent [19]
Amachi et al.

[11] Patent Number: 5,103,321
[45] Date of Patent: Apr. 7, 1992

[54] IMAGE SENSOR IMMUNE TO NOISE SIGNALS ORIGINATING FROM AN ALTERNATING POWER SUPPLY

[75] Inventors: Nobumitsu Amachi; Toshiji Hamatani, both of Atsugi; Takeshi Fukada, Ebina; Mitsunri Sakama, Hiratsuka; Naoya Sakamoto; Mitsufumi Codama, both of Atsugi, all of Japan

[73] Assignee: Semiconductor Energy Laboratory Co., Ltd., Kanagawa, Japan

[21] Appl. No.: 283,823

[22] Filed: Dec. 13, 1988

[30] Foreign Application Priority Data
Dec. 14, 1987 [JP] Japan ................................ 62-315478

[51] Int. Cl.⁵ ............................................. H04M 1/40
[52] U.S. Cl. ........................................ 358/475; 358/471
[58] Field of Search ..................... 358/471, 475, 463; 250/578

[56] References Cited

U.S. PATENT DOCUMENTS

| | | | |
|---|---|---|---|
| 3,833,761 | 9/1974 | Houck | 358/475 |
| 4,737,857 | 4/1988 | Rucci et al. | 358/213.13 |
| 4,745,488 | 8/1988 | Kaifu et al. | 358/471 |
| 4,779,121 | 10/1988 | Okumura | 358/478 |

FOREIGN PATENT DOCUMENTS 288259  10/1988  European Pat. Off. .

*Primary Examiner*—Edward L. Coles, Sr.
*Attorney, Agent, or Firm*—Sixbey, Friedman, Leedom & Ferguson

[57] ABSTRACT

An image sensor is described. The sensor comprises a sensor array and an alternating electric power supply. The frequency of the power supply is selected to be equal to or a multiple of the frequency at which the sensor array is scanned.

10 Claims, 2 Drawing Sheets

IMAGE SENSOR IMMUNE TO NOISE SIGNALS ORIGINATING FROM AN ALTERNATING POWER SUPPLY

BACKGROUND OF THE INVENTION

The present invention relates to an image sensor, more particularly to an image sensor which is constructed immune to noise originating from an alternating power supply.

LED (Light Emitting Diode) arrays, xenon lamps, fluorescent lamps and the like have been broadly used for lighting originals along the reading line in facsimile machines, copying machines and so forth. There are some difficulties in designing such machines as follows. Namely, while LED arrays emit little electromagnetic noise since they are powered by DC voltages, their emission intensities tend to vary along the length. FIG. 1 illustrates this situation. The abscissa represents the positions of 1728 diodes arranged in a line. Line 7 shows constant level of the brightness of an original from which light rays are reflected toward an image sensor. Curve 6 indicates the output signals of the image sensor at the positions corresponding to the respective diodes. As shown in the figure, the output levels of the diodes are different due to the disparity of the performances of the constituent LEDs.

On the other hand, xenon and fluorescent lamps can emit light rays whose intensities are equal along the length, but also produce adverse electromagnetic noise. FIG. 2 shows an exemplary output signal waveform of an image sensor employed in a conventional reading device in accordance with the prior art. As apparent from the figure, the output signal suffers disturbance, such as modulation, due to electromagnetic noise from an alternating power supplied to the lamp in accordance with the lighting repetition at the frequency of the alternating power supply.

Particularly, in case of facsimile machines in which an image sensor is located close to the light source, the image sensor, which has to control weak signals, is very sensitive to electromagnetic noise. It is desirable for stabilizing the output of the image sensor to insure against disparity of intensity over the length of the lamp. No lamp, however, is available at the present which can simultaneously overcome these two problems of the disparity of intensity and the electromagnetic noise. Examples of measure against the problems are the use of an electromagnetic shield and the provision of a shading compensation circuit, which in turn result in a complicated, large-sized and expensive structure.

SUMMARY OF THE INVENTION

It is an object of the present invention to provide a simple, compact and inexpensive image sensor.

It is another object of the present invention is to provide an image sensor which suffers no adverse noise from the associated light source.

DETAILED DESCRIPTION OF THE PREFERRED EMBODIMENTS

Figure 1:
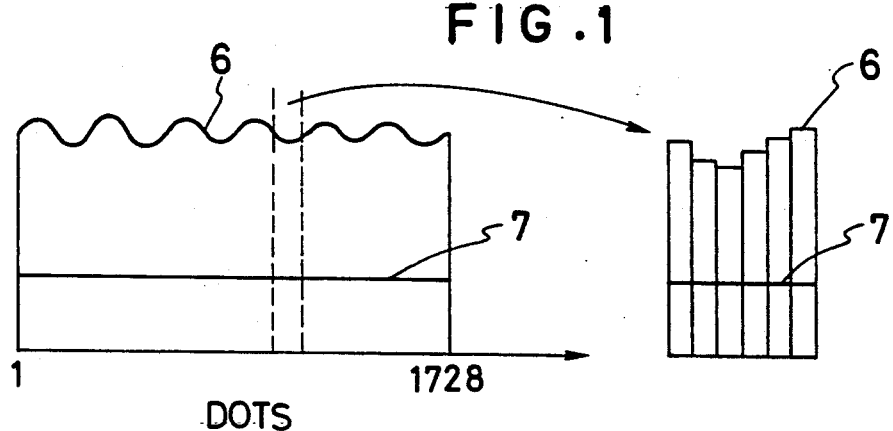
FIG. 1 is an explanatory diagram showing the disadvantage of the use of a LED array.
Figure 2:
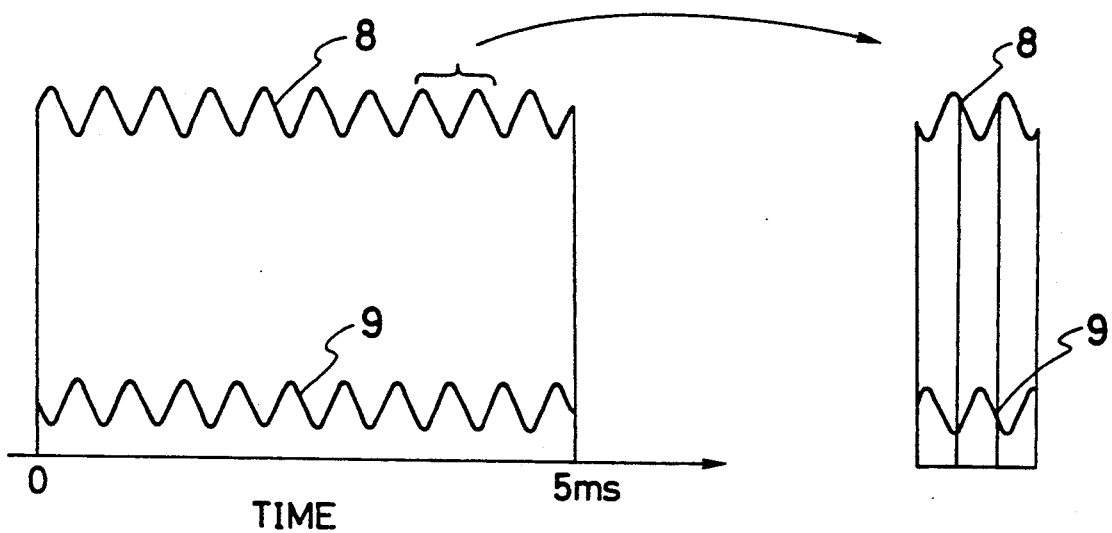
FIG. 2 is an explanatory diagram showing the disadvantage of the use of a conventional image sensor.
Figure 3:
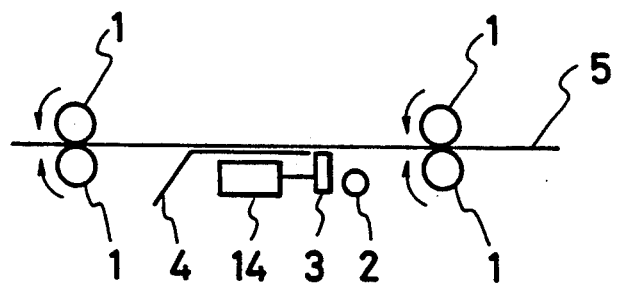
FIG. 3 is a schematic diagram showing an exemplary image sensor in accordance with the present invention.

Referring now to FIG. 3, a visual information reading device for a facsimile machine is illustrated in accordance with the present invention. In the figure, an original is advanced by means of a plurality of rolls 1 provided in the entrance and exit sides in pairs. The position of the original 5 is supported and adjusted by a paper guide 4. Located adjacent to the guide 4 is an image sensor 3 which detects light rays emitted from an associated xenon lamp 2 and reflected from the original 5. The image sensor comprises a plurality of 100 microns × 110 microns photoelectric conversion devices made of amorphous silicon semiconductor which are arranged in a row at 8 devices per 1 mm. The total number of the conversion devices is 1728. Since the intensity of the array within 5 mm from the ends may be insufficient, the length of the lamp is selected to be 225 mm, which is about 10 mm longer than that of the image sensor.

Figure 4:
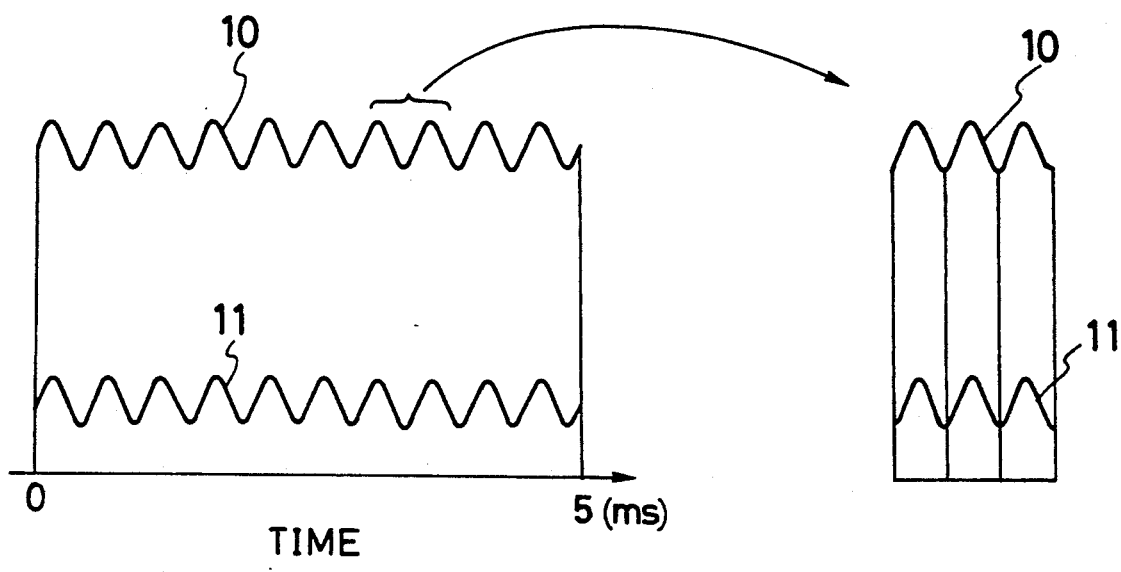
FIG. 4 is an explanatory diagram showing the relation between the intensity of a xenon lamp and the detection timing of an image sensor in accordance with the present invention.

The image sensor is operated at 359 KHz in order that the 1728 photoelectric conversion devices can be scanned within 5 milliseconds by means of an associated driving circuit 14. The important point is that the scanning frequency of the image sensor and the frequency of the electric power supplied to the lamp (lighting frequency) are selected to be equal to each other. FIG. 4 shows this relation. Numeral 10 represents the intensity of light rays which varies with time. Numeral 11 represents the timing of the intensity detection by the image sensor. Since the frequencies of the former and the latter are exactly equal, the light detection can be made alway in the same condition. Once the detection is carried out at a top of the curve 10, following detection is repeated also at tops. While the two frequencies must be equal, the phases have not be same.

Figure 5:
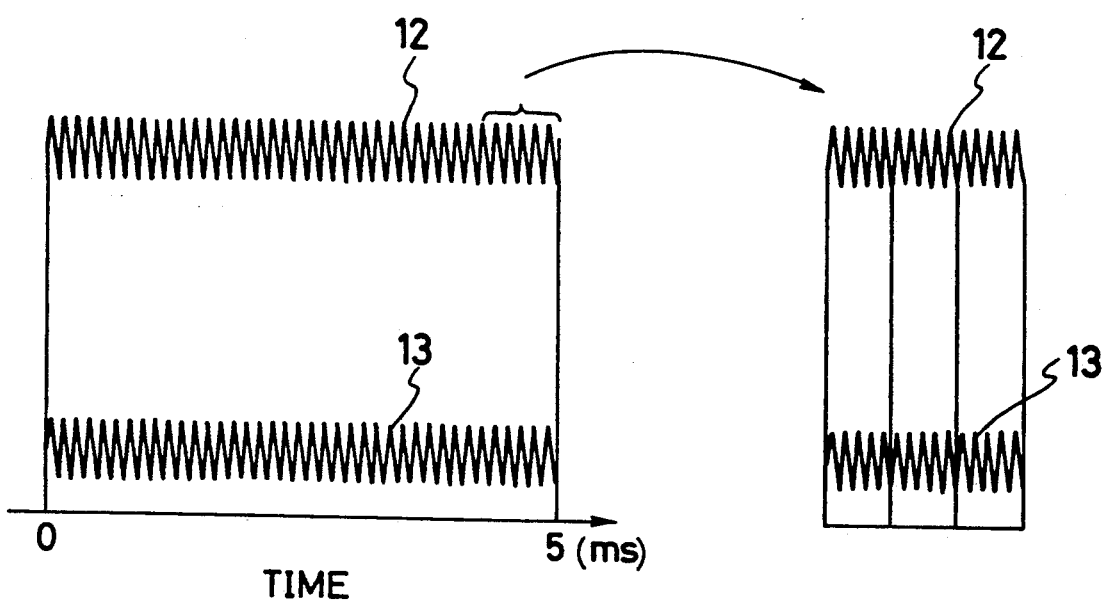
FIG. 5 is another explanatory diagram showing the relation between the intensity of a xenon lamp and the detection timing of an image sensor in accordance with the present invention.

FIG. 5 is a graphical diagram schematically showing the relation between the intensity of the xenon lamp and the timing of detection by the image sensor. The frequency of electric power supplied to the lamp is selected to 1.4 MHz which is four times higher than the frequency of the detection timing frequency of the image sensor. The frequency of the power supply may be any multiple of the frequency of the timing.

While several embodiments have been specifically described, it is to be appreciated that the present invention is not limited to the particular examples described and that modifications and variations can be made without departure from the scope of the invention as defined by the append claims.

We claim:

1. An image sensor comprising:
    a plurality of photosensitive devices devices arranged in an array; and
    a light source powered by an alternating electric power supply,
    said photosensitive devices devices and said light source being arranged in order that said photosensitive devices devices receive light rays emitted from said light source and reflected on a surface containing an image to be sensed, and produce output signals indicative of the image, wherein the frequency of the alternating electric power is selected to be a multiple greater than one of the frequency at which said photosensitive devices devices are scanned in their operation.

2. The sensor of claim 1 adapted for a facsimile machine.

3. The sensor of claim 1 wherein said photosensitive devices devices are arranged in a row.

4. The sensor of claim 1 wherein said light source is a xenon lamp.

5. The sensor of claim 4 wherein the frequency of power supplied to said xenon lamp is selected at 350 KHz.

6. The sensor of claim 4 wherein the frequency of power supplied to said xenon lamp is selected at 1.4 MHz.

7. An image reading means comprising:
an image sensor for detecting light reflected on a surface of an original; and
a light source for emitting light on said original,
wherein said light source is supplied with an AC power source having a frequency selected to be a positive integer multiple greater than one of an operation frequency of said image sensor.

8. An image reading means as in claim 7 wherein said image sensor comprises a plurality of photosensitive devices arranged in a row.

9. An image reading means as in claim 8 wherein said photosensitive devices are photoelectric conversion devices.

10. An image reading means comprising:
a light source for emitting light on an original; and
an image sensor comprising a plurality of photosensitive devices arranged in a row for receiving light reflected on said original, where said plurality of photosensitive devices scanned with signals at a predetermined operation frequency;
wherein said light source is supplied with an AC power source which is synchronized with said signals and the frequency of said AC power is a positive integer multiple greater than one of said operation frequency.

* * * * *